United States Patent [19]

Yamashita et al.

[11] Patent Number: 4,590,266
[45] Date of Patent: May 20, 1986

[54] PROCESS FOR PREPARING CELLULOSE ACETATE

[75] Inventors: Mitsuru Yamashita; Kouji Shima, both of Himeji, Japan

[73] Assignee: Daicel Chemical Industries, Ltd., Sakai, Japan

[21] Appl. No.: 687,302

[22] Filed: Dec. 28, 1984

[30] Foreign Application Priority Data

Dec. 28, 1983 [JP] Japan .................... 58-245665

[51] Int. Cl.$^4$ .................................... C08B 3/06
[52] U.S. Cl. ............................... 536/69; 536/71; 536/73
[58] Field of Search .................. 536/69, 71, 73

[56] References Cited

U.S. PATENT DOCUMENTS

| | | | |
|---|---|---|---|
| 1,236,579 | 8/1917 | Lindsay | 536/69 |
| 1,536,311 | 5/1925 | Seel | 536/69 |
| 1,956,832 | 5/1934 | Mason | 536/69 |
| 2,136,030 | 11/1938 | Stone | 536/69 |

*Primary Examiner*—Ronald W. Griffin
*Attorney, Agent, or Firm*—Flynn, Thiel, Boutell & Tanis

[57] ABSTRACT

Cellulose acetate is effectively prepared from cellulose and acetic anhydride in a solvent of acetic acid in the presence of a catalyst of sulfuric acid, when the reaction system is being evacuated at least before the reaction mixture reaches a boiling point thereof until the reaction completes, so that the vapor evolved from the reaction mixture may be condensed to distill off and the reaction product may be concentrated.

6 Claims, No Drawings

PROCESS FOR PREPARING CELLULOSE ACETATE

This invention relates to a process for preparing cellulose acetate. More particularly it relates to a process for preparing cellulose acetate characterized by evacuating an acetylation reaction system, applying the reaction heat evolved by the acetylation to the latent heat necessary for evaporating a volatile solution, condensing and distilling off the evolved vapor of the volatile solution from the reaction system with a condenser and concentrating the reaction product in the reaction system with the progress of the acetylation.

Typical processes for preparing cellulose acetate by acetylation may be roughly classified into the so-called acetic acid process wherein acetic anhydride, acetic acid and sulfuric acid are used as an acetylating agent, a solvent and a catalyst, respectively, and the so-called methylene chloride process wherein acetic anhydride, methylene chloride and sulfuric acid are used as an acetylating agent, a solvent and a catalyst, respectively. The present invention provides an improved technique of the acetic acid process.

The acetic acid process for preparing cellulose acetate comprises: (1) a pretreatment and activation step wherein a cellulosic material containing a relatively high amount of α-cellulose is macerated and ground and acetic acid optionally containing a small amount of an acidic catalyst is spread thereon; (2) an acetylation step wherein the activated cellulose obtained in step (1) is treated with a precooled acidic mixture comprising acetic anhydride, acetic acid and an acidic catalyst such as sulfuric acid to give primary cellulose acetate; (3) an aging step wherein the primary cellulose acetate prepared in the acetylation step is hydrolyzed to the desired degree of acetylation to obtain secondary cellulose acetate; (4) a posttreatment step wherein the obtained secondary cellulose acetate is precipitated and washed with water or an aqueous solution of acetic acid followed by drying; and (5) an acetic acid recovery step wherein acetic acid is recovered from the dilute aqueous solution of acetic acid discharged from the posttreatment step for the reuse thereof.

However the preparation of cellulose acetate by the acetic acid process has the following disadvantages.

(1) Since the acetylation in step (2) is a vigorous exothermic reaction, it is necessary to previously cool the mixture of acetic anhydride, acetic acid and sulfuric acid and to cool the reactor externally with a refrigerant such as brine after introducing the cellulose material to control the temperature of the acetylation, thus preventing depolymerization of the cellulose and maintaining the degree of polymerization of the final secondary cellulose acetate. Accordingly an extremely large amount of energy is required to cool these materials and to remove the reaction heat.

(2) The acetic acid recovery step (5) wherein acetic acid is recovered from the dilute aqueous solution of acetic acid also consumes a large amount of energy which contributes to an increase in the cost of the preparation of cellulose acetate in these days of high cost of energy.

Under these circumstances, some methods for partially improving a process for preparing cellulose acetate have been proposed. For example, U.S. Pat. No. 2,136,030 has disclosed a process for overcoming the disadvantage (1) which comprises evacuating the acetylation system, applying the reaction heat to the latent heat necessary for evaporating a mixture of acetic acid and acetic anhydride, condensing the evolved vapor with a condenser to reflux to the reaction system, thereby controlling the reaction temperature without cooling a mixture of acetic acid, acetic anhydride and sulfuric acid nor externally cooling the reactor.

We performed experimental acetylation according to the process as disclosed above with the use of 240 parts (by weight; the same applies hereinafter) of acetic anhydride, 4 parts of sulfuric acid and 250, 450 and 640 parts of acetic acid each based on 100 parts of cellulose. The pressure in the reaction system was 57 Torr and a kneader acetylator was employed. Consequently it was found that, when a relatively small amount (i.e. 250 or 450 parts) of acetic acid was employed, the refluxed liquor condensed in the condenser would exhibit a poor compatibility with the dope in the reactor which made it impossible to homogeneously agitate and mix the contents of the reactor, thus inhibiting complete acetylation. This might be caused by the fact that it would be very difficult to agitate and mix the refluxed liquor having a low viscosity with the acetylated dope having a high viscosity. Therefore it is necessary to use at least 640 parts by weight of acetic acid for performing acetylation by the foregoing process, which would result in a disadvantage from a viewpoint of energy conservation since the amount of acetic acid to be recovered in step (5) would be increased.

Several improved solvents have been proposed for efficiently extracting acetic acid from the aqueous solution of acetic acid to thereby overcome the disadvantage (2) as described above. However these improved solvents would not bring about a significant decrease in the energy consumption unless a substantial amount of the acetic acid might be reduced.

Taking into account these known techniques, we have attempted to establish a novel process from our own viewpoint, thus completing the present invention which provides an improved process to overcome the abovementioned disadvantages (1) and (2).

Accordingly the present invention provides a process for preparing cellulose acetate by the use of cellulose, acetic anhydride, acetic acid and sulfuric acid as a starting material, an acetylating agent, a solvent and a catalyst, respectively, which comprises evacuating the reaction system during the whole or partial period of acetylation including the initial stage, condensing and distilling off the evolved vapor from the reaction system to thereby concentrate the reaction product.

According to the invention, cellulose acetate is effectively prepared from cellulose and acetic anhydride in a solvent of acetic acid in the presence of a catalyst of sulfuric acid, when the reaction system is being evacuated at least before the reaction mixture reaches a boiling point thereof until the reaction completes, so that in this period the vapor evolved from the reaction mixture may be condensed to distill off and the reaction product may be concentrated.

The acetylation reaction of the invention usually starts with addition of the catalyst to the reactants. Then the reaction temperature gradually gets higher up to a boiling point of the reaction mixture. This point is the maximum temperature in the reaction. After that, it gets lower slowly until the reaction completes. The length of the acetylation time is from addition of the catalyst to completion of the reaction. The initial stage of the acetylation is from addition of the catalyst until the maximum reaction temperature.

A period when the evacuation should essentially be conducted in the reaction is at least before the reaction mixture reaches a boiling point thereof until the reaction finishes. In other words, the reaction system has been conditioned under a reduced pressure before the reaction temperature is at the maximum.

In the practical sense, the reaction system may be evacuated during the full length of the acetylation reaction. Alternatively, the reaction may be evacuated before addition of the catalyst. It is preferred that the resulting reduced pressure is in the range between 40 Torr. and 150 Torr.

In the process of the present invention, the acetylation system may be evacuated at the initial stage, i.e. before adding the catalyst to initiate the reaction or during the period from the addition of the catalyst till the moment of reaching the boiling point corresponding to the predetermined vacuum. The evacuation initiated at the point as described above may be continued throughout the acetylation or for a part thereof.

Now preferred embodiments of the present invention will be given.

A mixture of 200 to 400 parts of acetic anhydride and 100 to 300 parts of glacial acetic acid are added to 100 parts of cellulose which has been previously treated and activated. The reactor is evacuated to a vacuum of 40 to 150 Torr and a mixture of 0.5 to 5 parts of sulfuric acid and 10 to 100 parts of acetic acid is added to initiate the acetylation. The evaporated vapor mixture of acetic acid and acetic anhydride is condensed in a condenser and distilled off from the reaction system. The reaction product is gradually concentrated. When a certain amount corresponding to the desired reaction ratio of the product is distilled or when there is little liquor to be distilled, the reactor is adjusted to atmospheric pressure and maintained for one to 30 min thereafter to completely or partially neutralize the sulfuric acid catalyst, thus giving cellulose acetate.

The degree of vacuum of the evacuated reaction system may be adjusted depending on the desired acetylation temperature. For example, when acetylation is initiated by the use of acetic acid and acetic anhydride at a weight ratio of 7:3 under a vacuum in the reaction system of 45 Torr at 40° C., the temperature in the reaction system rapidly rises owing to the reaction heat to approach the boiling point (i.e. 50° C.) and a vapor mixture of acetic acid and acetic anhydride at a ratio corresponding to the ratio in the reactor is distilled off, i.e., when acetic acid and acetic anhydride are present in the reactor at a ratio of 7:3, the vapor contains those compounds at a ratio of 8.5:1.5. Thus the reaction heat is applied to the latent heat necessary for evaporating the mixture of acetic acid and acetic anhydride to thereby control the acetylation temperature. Since the acetic anhydride is slowly consumed by the reaction, the temperature in the reaction system would slowly drop to approximately 45° C. which corresponds to the boiling point of acetic acid at 45 Torr. When the degree of vacuum is adjusted to atmospheric pressure in the course of the reaction, the reaction heat would slowly raise the temperature in the reaction system to a peak. That is, the reaction temperature in vacuo would correspond to the boiling point of the liquid phase at that degree of vacuum. A pressure lower than 40 Torr would result in disadvantages from a viewpoint of equipment while that higher than 150 Torr would result in a temperature which is too high to give a product of good quality.

Any convenient known reactor may be used in the process of the present invention for preparing cellulose acetate although a kneader reactor is preferable.

It can not be said so effective to remove the reaction heat by externally cooling the reactor since the exothermic reaction is significantly vigorous and the acetylated dope would generally exhibit a high viscosity. Therefore it has been necessary to previously cool acetic anhydride, acetic acid and sulfuric acid in performing acetylation under atmospheric pressure. On the contrary, the process of the present invention may be performed without the abovementioned cooling since the reaction temperature is controlled in vacuo. In this case, the acetylation is preferably performed at a temperature higher than room temperature since acetic acid and acetic anhydride are industrially produced at temperatures (e.g. 40 to 80° C.) higher than room temperature in general and the cooling water for the condenser which is used to condense the vapor mixture of acetic acid and acetic anhydride in vacuo is preferably industrial water. In the process of the present invention, the vapor mixture of acetic acid and acetic anhydride evolved by the heat of acetylation should be condensed in a condenser and discharged from the reaction system. When the condensate is refluxed into the reactor, the highly viscous material (i.e. acetylated dope) should be agitated and mixed with the material of a low viscosity (i.e. the refluxed liquor) which would bring about significant problems. That is, the refluxed liquor would partially cover the acetylated dope and run around together with the agitating blades and the whole or part of the dope, which makes the mixing in the overall reaction system insufficient to thereby inhibit homogeneous acetylation. In addition, uneven dispersion of the refluxed liquor in the reactor would result in nonuniformity in concentration and the dope may sometimes solidify partially. Accordingly when refluxing the condensate, a large amount of acetic acid should be used to maintain the low viscosity of the acetylated dope, which results in an increase in the amount of the acetic acid to be recovered later, thus bringing about a disadvantage from a viewpoint of energy. In the process of the present invention wherein a lower amount of acetic acid is used in the acetification, the reaction product may be concentrated to the desired concentration with no problem of uneven mixing as described above. In addition, the process of the present invention wherein the condensate is distilled off would make it possible to use a larger amount of acetic acid and acetic anhydride at the initial stage than the conventional process wherein the condensate is refluxed thus giving a more uniform reaction even when the both processes give the same composition of the reactants after completing the acetylation. In the process of the present invention, the mixture of acetic acid and acetic anhydride distilled off from the reaction system may be reused in acetylation as such. As there is a certain relationship between the amount of the distilled mixture and the acetylation ratio, the heat of reaction of acetic anhydride with unreacted cellulose would be evolved to raise the reaction temperature to a corresponding extent by bringing the reaction system back to atmospheric pressure during the reaction depending on the amount of the distillate. Some heat dissipation would bring the reaction system to a peak temperature and the temperature would begin to drop thereafter. Thus, the peak temperature may be controlled under the guidance of the amount of the distillate. It is further possible to control the reaction temperature by adjusting the pressure. Thus the reaction temperature at the completion of the acetylation may be raised by bringing the system to atmospheric pressure whereby the reaction may be accelerated and the apparent viscosity of the acetylated dope may be lowered, which makes the dope easy to handle. Since, however, it would result in a decrease in the degree of polymerization of the obtained cellulose acetate, it is necessary to set the upper limit of the peak temperature depending on the amount of sulfuric acid used as the catalyst to obtain the degree of polymerization required in the art.

To further illustrate the present invention, the following examples will be given.

EXAMPLE 1

Sulfite pulp containing 96.5% of alpha-cellulose was crushed and dried to a moisture content of approximately 5%. 35 parts of glacial acetic acid was added to 100 parts of the pulp containing 5% of moisture and the mixture was pretreated at 40° C. for 30 min for activation. A mixture (40° C.) of 247 parts of acetic anhydride and 438 parts of glacial acetic acid was introduced into a kneader acetylator and the pretreated and activated cellulose was added thereto followed by agitation at 57 Torr. A catalyst solution comprising 3.8 parts of sulfuric acid and 100 parts of glacial acetic acid at 40° C. was introduced into the acetylator to initiate the reaction. 20 min after the initiation, 231 parts of a distillate containing 5% of acetic anhydride and the balance of acetic acid was obtained and the acetylator was brought back to atmospheric pressure. The agitation was performed satisfactorily and the reaction system was maintained at a pressure of approximately 57 Torr while successfully controlling the reaction temperature. The reaction temperature rose to approximately 54° C. immediately after the addition of the catalyst solution of sulfuric acid and dropped to approximately 51° C. after 20 min. Then it rose to a peak temperature of 53° C. 12 min after bringing to atmospheric pressure. One min thereafter, 16 parts of a 38% aqueous solution of magnesium acetate was added to completely neutralize sulfuric acid in the system and to give an excessive amount of magnesium acetate. To the completely neutralized reaction mixture, 71 parts of water (60° C.) was added and thoroughly agitated. The reaction mixture was transferred to an autoclave and eternally heated to 150° C. over a period of 90 min and maintained at this temperature for 30 min. Then it was externally cooled to 100° C. over a period of 20 min and hydrolyzed to give the secondary cellulose acetate. The reaction mixture was added to a diluted aqueous solution of acetic acid under vigorous agitation to separate the secondary cellulose acetate in the form of flakes, which were subsequently washed with water thoroughly, taken out and dried. The secondary cellulose acetate in the form of flakes exhibited a sufficient quality required in the art.

The liquid distillate obtained during the acetylation could be reused for additional acetylation as such, which resulted in a decrease in the amount of the acetic acid to be recovered in the acetic acid recovery step compared to the conventional processes for acetylation, thus contributing to the energy conservation.

EXAMPLE 2

Sulfite pulp containing 96.5% of alpha-cellulose was crushed and dried to a moisture content of 5%. 33 parts of glacial acetic acid was added to 100 parts of the pulp containing 5% of moisture and the mixture was pretreated for activation. A mixture (40° C.) of 309 parts of glacial acetic acid and 252 parts of acetic anhydride was introduced into a kneader acetylator and the pretreated and activated cellulose was added thereto followed by agitation at 45 Torr. A catalyst solution (40° C.) comprising 1.5 parts of sulfuric acid and 38 parts of glacial acetic acid was introduced into the acetylator to initiate the reaction. The reaction temperature immediately rose to 51° C. and dropped to 49° C. 21 min after the addition of the catalyst solution. Then the acetylator was brought to atmospheric pressure. Thus 148 parts of a distillate was obtained which comprised 9% of acetic anhydride and the balance of acetic acid. 35 min after bringing to the atmospheric pressure, the acetylator reached a peak temperature of 67° C. Four min thereafter, 24 parts of a 9.4% aqueous solution of magnesium acetate was added to completely neutralize sulfuric acid in the system and to give an excessive amount of magnesium acetate. The agitation was carried out sufficiently and the pressure in the system was maintained at 45 Torr while successively controlling the reaction temperature. 59 parts of water (60° C.) was added to the completely neutralized reaction mixture and the reaction mixture thus obtained was transferred into an autoclave. Then it was externally heated to 150° C. over a period of 90 min and maintained at this temperature for 30 min to hydrolyze the primary cellulose acetate. Subsequently it was externally cooled to 100° C. over a period of 20 min to give the second cellulose acetate. The reaction mixture was added to a diluted aqueous solution of acetic acid under vigorous agitation to separate the secondary cellulose acetate in the form of flakes, which were then washed with water thoroughly and dried. The secondary cellulose acetate in the form of flakes thus obtained exhibited a sufficient quality required in the art.

In addition, the liquid distillate obtained during the acetylation could be reused in additional acetylation as such similar to Example 1.

EXAMPLE 3

Sulfate pulp containing 98.0% of α-cellulose was crushed and dried to a moisture content of approximately 5%. 33 parts of glacial acetic acid was added to 100 parts of the pulp containing 5% of moisture and the obtained mixture was pretreated at room temperature for approximately 4 hours for activation. A mixture (40° C.) of 258 parts of acetic anhydride and 350 parts of glacial acetic acid was introduced into a kneader acetylator and the pretreated and activated cellulose was added thereto at 40° C. A catalyst solution (40° C.) comprising 2 parts of sulfuric acid and 84 parts of glacial acetic acid was added to the reactor at a rate of 4.3 parts per min to initiate the reaction. After starting the addition of the catalyst solution, the reactor was evacuated to a vacuum of 70 Torr. Distillation began 5 min after the initiation of the addition of the catalyst solution while the reactor was maintained at approximately 53.5° C. and 70 Torr. After approximately 23 min, 205 parts of a liquid distillate in total comprising 8% of acetic anhydride and the balance of acetic acid was obtained and the reactor was brought to atmospheric pressure. The temperature in the reactor was approximately 52.5° C. The agitation was sufficiently performed and the system was maintained at approximately 70 Torr while successfully controlling the reaction temperature. After returning to atmospheric pressure, the reaction temperature rose to approximately 58° C. 35 min after the initiation of the addition of the catalyst solution, 21 parts of a 14.4% aqueous solution of magnesium acetate was added to completely neutralize the sulfuric acid in the system and give an excessive amount of magnesium acetate. The completely neutralized reaction mixture was transferred into an autoclave and 30 parts of steam was introduced over a period of 90 min to heat the contents of the autoclave to 143° C. while externally heating at the same time. After maintaining this temperature for 48 minutes, it was externally cooled to 100° C. over a period of approximately 10 min and hydrolyzed to give secondary cellulose acetate. The reaction mixture was poured into water under vigorous agitation to separate the secondary cellulose acetate in the form of flakes, which were subsequently washed with water throughly, taken out and dried. The obtained secondary cellulose acetate in the form of flakes exhibited a sufficient quality required in the art.

The liquid distillate obtained during the acetylation could be reused as such in additional acetylation similar to Example 1.

The embodiments of the invention in which an exclusive property or privilege is claimed are defined as follows:

1. In a process for preparing cellulose acetate from cellulose and acetic anhydride in a solvent of acetic acid in the presence of a catalyst of sulfuric acid, the improvement which comprises: the reaction system is evacuated at least before the reaction mixture reaches the boiling point thereof until reaction completes, so that the vapor evolved from the reaction mixture is condensed to distill off and the reaction product is concentrated.

2. A process as claimed in claim 1, in which the reaction system is evacuated during the full length of the acetylation reaction.

3. A process as claimed in claim 1, in which the reaction system is evacuated before addition of the catalyst.

4. A process as claimed in claim 1, in which the resulting reduced pressure is in the range of from 40 Torr. to 150 Torr.

5. A process for preparing cellulose acetate, which comprises: in a reaction system, acetylating cellulose with acetic anhydride, in the presence of sulfuric acid as a catalyst and in the presence of acetic acid as a solvent for the cellulose acetate that is produced; establishing a pressure in the range of from 40 to 150 torr in the reaction system while the acetylating reaction is proceeding and before the reaction system reaches its maximum reaction temperature thereby to evolve a vapor of acetic acid and acetic anhydride from the reaction system; condensing said vapor to form a condensate liquid of acetic acid and acetic anhydride and discharging said condensate liquid from the reaction system, whereby the exothermic reaction heat of the acetylating reaction supplies the latent heat of vaporization of acetic acid and acetic anhydride and thereby the temperature of the liquid reaction medium is controlled.

6. A process as claimed in claim 5, in which the reaction system initially contains 100 parts of cellulose, 200 to 400 parts of acetic anhydride and 100 to 300 parts of glacial acetic acid, the reaction system is evacuated to a pressure in said range and a mixture of 0.5 to 5 parts of sulfuric acid and 10 to 100 parts of acetic acid is added to initiate the acetylation reaction.

* * * * *